May 25, 1926.
A. L. FONTAN
1,586,190
BODY FOR MOTOR VEHICLES
Filed Nov. 24, 1924     5 Sheets-Sheet 1
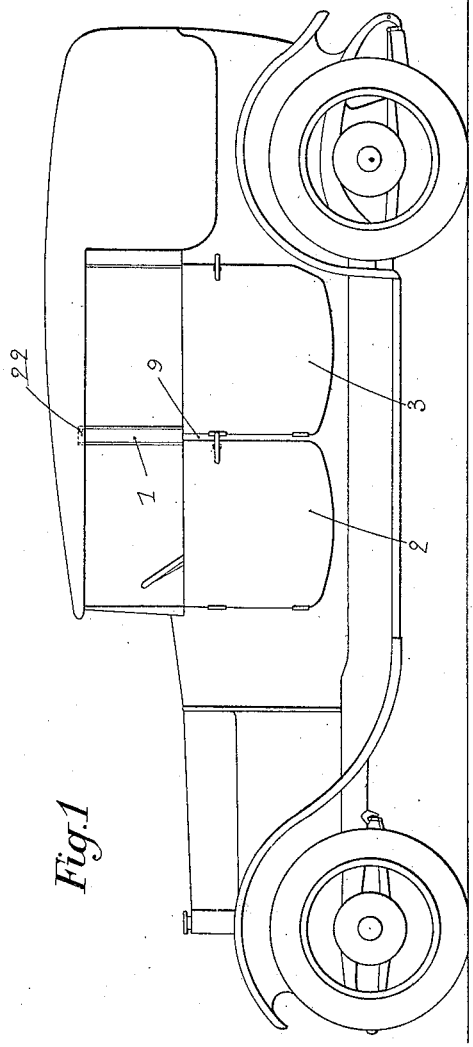
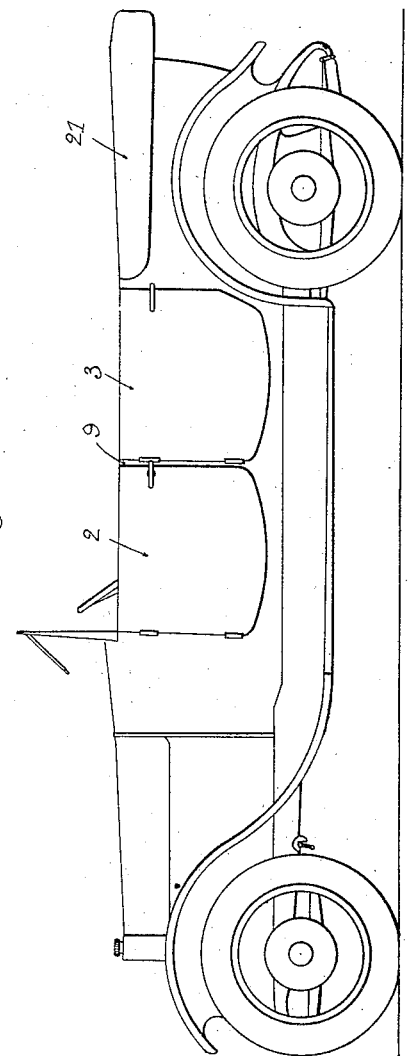
INVENTOR:
André Louis Fontan
BY: Francis E. Boyce
ATTORNEY May 25, 1926.

A. L. FONTAN 1,586,190

BODY FOR MOTOR VEHICLES

Filed Nov. 24, 1924    5 Sheets-Sheet 2

INVENTOR:
André Louis Fontan
BY: Francis E. Boyce
ATTORNEY

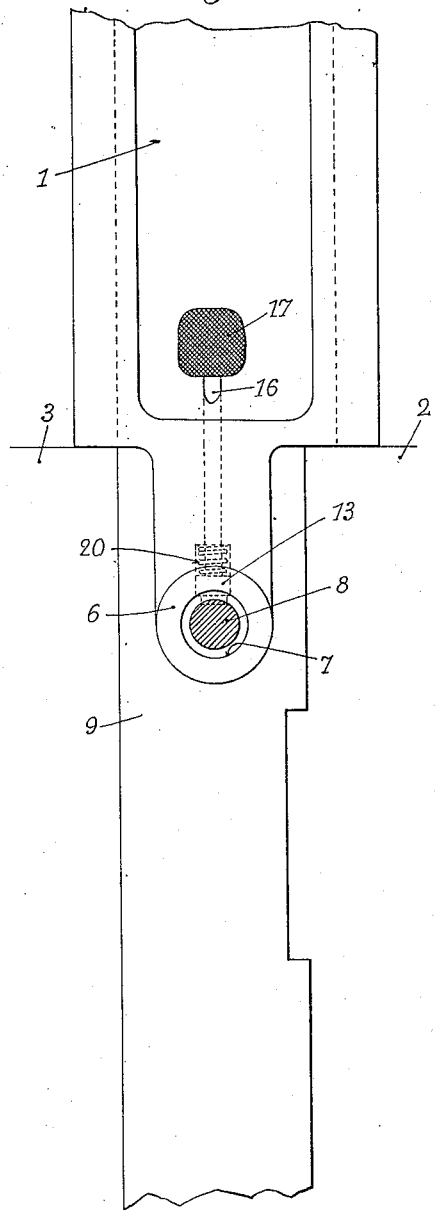
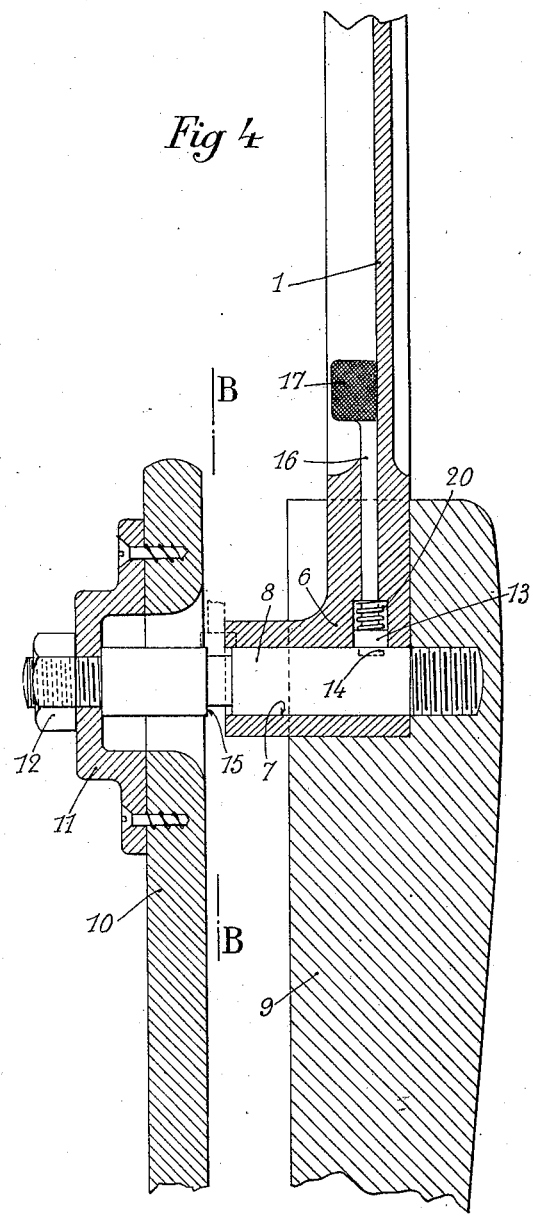

May 25, 1926.

A. L. FONTAN

BODY FOR MOTOR VEHICLES

Filed Nov. 24, 1924   5 Sheets-Sheet 4

1,586,190

INVENTOR:
André Louis Fontan
BY: Francis E. Boyer
ATTORNEY

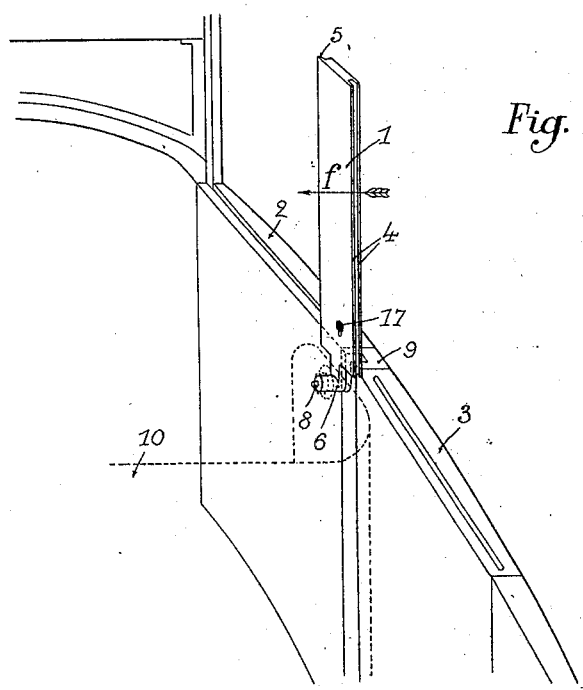
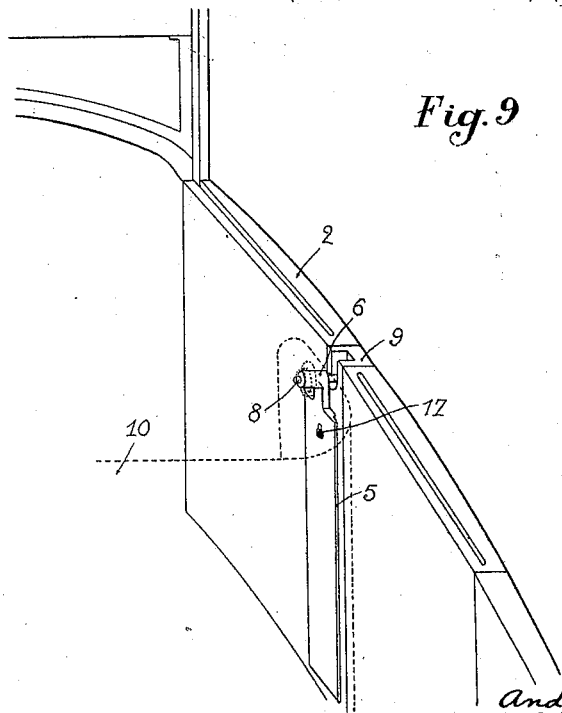

Patented May 25, 1926.

1,586,190

UNITED STATES PATENT OFFICE.

ANDRÉ LOUIS FONTAN, OF PARIS, FRANCE, ASSIGNOR TO DELAGE & CIE., OF PARIS, FRANCE.

BODY FOR MOTOR VEHICLES.

Application filed November 24, 1924. Serial No. 751,745.

The present invention relates to improvements in transformable bodies for motor vehicles.

One object of the invention is to facilitate the transformation of the body while permitting the upper part of the top to be held rigidly.

For these purposes the body according to the invention comprises two uprights or supports which are disposed on either side of the interior of the vehicle body between the front and rear doors, and are adapted to pivot upon horizontal shafts axles constituting cross pieces between the vehicle body and the frame carrying the front seats in such manner that the uprights may be concealed between said body and said frame when they are not used for holding the top.

Other features of the device according to the invention will be disclosed in the following description.

In the appended drawings which are given by way of example:

Fig. 1 shows a motor vehicle in which the transformable body according to the invention is arranged for inside driving.

Fig. 2 shows the same vehicle converted into a torpedo.

Fig. 4 is a section on the line A—A of Fig. 3.

Fig. 5 is an elevation of the upright base, partly in section on the line B—B of Fig. 4.

Figs. 6 to 9 are perspective views in the interior of the vehicle, showing the successive positions of the upright on the right hand side of the vehicle, the upright being brought from the top supporting position to the concealed position.

Figure 3:
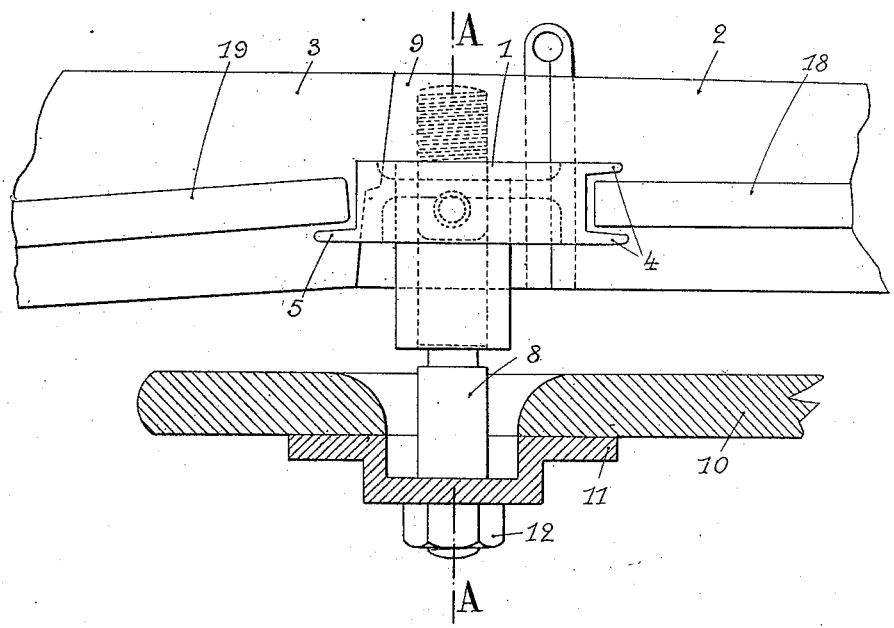
Fig. 3 is a plan view of the part of the body comprising the upright on the right hand side of the vehicle the adjacent portion of the frame carrying the front seats being shown in horizontal section.

The transformable body according to the invention comprises two intermediate uprights or supports, one on each side of the vehicle. The drawings show only the upright 1 disposed between the forward door 2 and the rear door 3, on the right hand side of the vehicle. The upright on the left-hand side is similar to the upright on the right hand side of the vehicle and is mounted in a correspondingly similar position.

The upright is of a metallic construction and comprises a rear double rabbet 4 and a front rabbet 5. The sliding frames for the glass panes of the doors 2, 3, or the edges of the glass panes themselves 18 and 19, are respectively guided by the rabbets 4 and 5. The lower end of the upright is formed with a socket 6 having therein a cylindrical bore 7 into which is inserted with slight friction a horizontal shaft 8 which is screwed into the body of the vehicle 9. The other end of the said shaft is supported by the frame 10 carrying the front seats through the medium of the cap 11 and the nut 12. When the upright is in operative position, i. e. is turned up, its lower end is adapted to fit in a corresponding recess provided in the vehicle body.

The said upright is provided with a catch 13 whose end may engage either the recess 14 or the groove 15 which are both formed in the shaft 8. The catch 13 is disposed at the end of a control rod 16 ending in a milled head 17 which protrudes beyond the inner face of the said upright. The catch 13 is urged towards the said shaft by a small spring 20 which is suitably disposed within the said upright.

Figure 6:
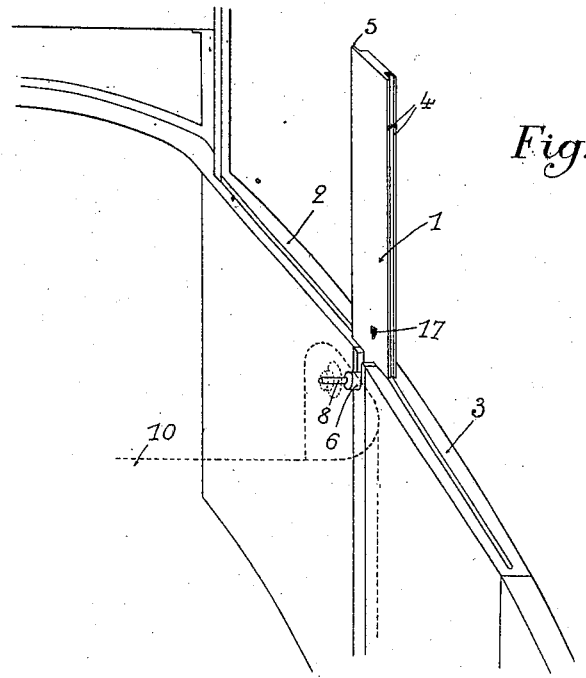
Figure 8:
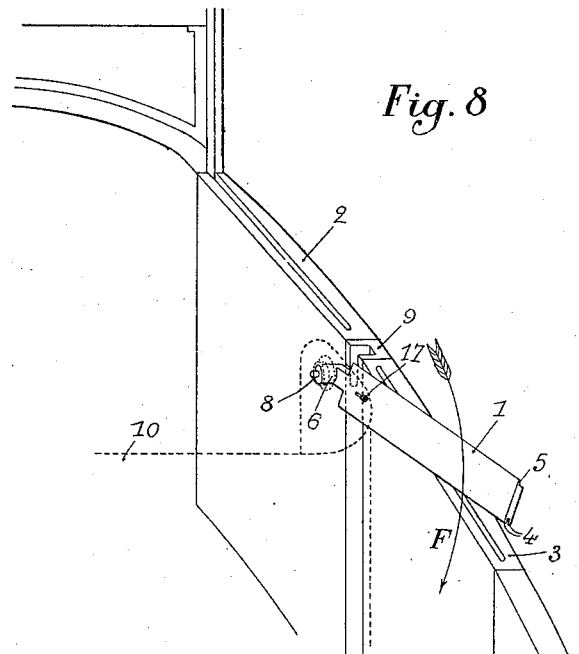

The operation of the upright is as follows:

The car body having been preliminarily arranged for inside driving, for example (Fig. 1), in order to transform the same into a torpedo, the top is first lowered and is stowed at 21 in the known manner, Fig. 2. The two uprights remain in the vertical position, as shown in Fig. 6 for the right hand upright 1, and are held in this position by their respective catches 13 engaging the recesses 14 and maintained therein by the springs 20. The milled head 17 is then pushed up so as to disengage the catch, and the base of the upright is shifted upon the shaft 8 according to the arrow f, Fig. 7, until the catch engages the groove 15. The upright is then turned upon the shaft 8 according to the arrow F, Fig. 8, so as to bring it into the lower vertical position as shown in Fig. 9, in which it is observed that the said upright will be concealed between the vehicle body 9 and the frame 10.

The uprights according to the invention may be employed for car bodies which may be converted at will into a torpedo, or arranged for inside driving, as shown in Figs. 1 and 2, or for any other type, for instance it may also be used for converting a torpedo into a cabriolet. When the top is raised and attached to the wind shield, the said uprights serve to fill up the space between the two doors while their flanges will form guides for the sliding glass panes of the doors. At the same time, the top which is attached to the upper part of the uprights at 22 will be given all the desired rigidity.

Having now described my invention what I claim as new and desire to secure by Letters Patent is:

1. A transformable body for motor vehicles comprising a body, a top, front and rear doors on either side of said body, a frame carrying the front seats within said body and two uprights pivotally mounted on said body, one on each side of the latter, and adapted to be concealed between said body and said frame when they are turned down and to support said top when they are turned up.

2. A transformable body for motor vehicles comprising a body, a top, front and rear doors on either side of said body, a frame carrying the front seats within said body, two transverse shafts secured at one end to said body, respectively between the front and rear doors of one side, and at the other end to said frame and two uprights respectively and pivotally mounted on said shafts and adapted to be concealed between said body and said frame when they are turned down and to support said top when they are turned up.

3. A transformable body for motor vehicles comprising a body, a top, front and rear doors on either side of said body and provided with sliding windows, a frame carrying the front seats within said body, two transverse shafts secured at one end to said body, respectively between the front and rear doors of one side, and at the other end to said frame, two uprights respectively and pivotally mounted on said shafts and adapted to be concealed between said body and said frame when they are turned down and to support said top when they are turned up and rabbets formed on said uprights and adapted to guide the windows of the adjacent doors.

4. A transformable body for motor vehicles comprising a body, a top, front and rear doors on either side of said body, a frame carrying the front seats within said body, two transverse shafts secured at one end to said body, respectively between the front and rear doors of one side, and at the other end to said frame, two socket-carrying members pivotally and slidably mounted on said shafts, two uprights respectively carried by said socket-carrying members and adapted to be concealed between said body and said frame when they are turned down and to support said top when they are turned up and catches adapted to lock said uprights in either of said two positions.

5. A transformable body for motor vehicles comprising a body, a top, front and rear doors on either side of said body, a frame carrying the front seats within said body, two transverse shafts secured at one end to said body, respectively between the front and rear doors of one side, and at the other end to said frame, two socket-carrying members pivotally and slidably mounted on said shafts, and two uprights respectively carried by said socket-carrying members and adapted to be concealed between said body and said frame when they are turned down and to support said top when they are turned up, said body being provided with recesses wherein the lower ends of said uprights, together with their respective socket-carrying members, are adapted to fit when said uprights are in their raised position.

6. A transformable body for motor vehicles comprising a body, a top, front and rear doors on either side of said body, a frame carrying the front seats within said body, two transverse shafts secured at one end to said body, respectively between the front and rear doors of one side, and at the other end to said frame, two socket-carrying members pivotally and slidably mounted on said shafts, and two uprights respectively carried by said socket-carrying members and adapted to be concealed between said body and said frame when they are turned down and to support said top when they are turned up, said body being provided with recesses wherein the lower ends of said uprights, together with their respective socket-carrying members, are adapted to fit when said uprights are in their raised position, and said frame being provided with recesses through which said transverse shafts respectively extend and which are adapted to contain said socket-carrying members when said uprights are turned down.

In testimony whereof I have signed my name to this specification.

ANDRÉ LOUIS FONTAN.